Jan. 11, 1949.            G. B. HILL            2,458,994
                           BALING PRESS
Filed Sept. 4, 1945                           2 Sheets-Sheet 1
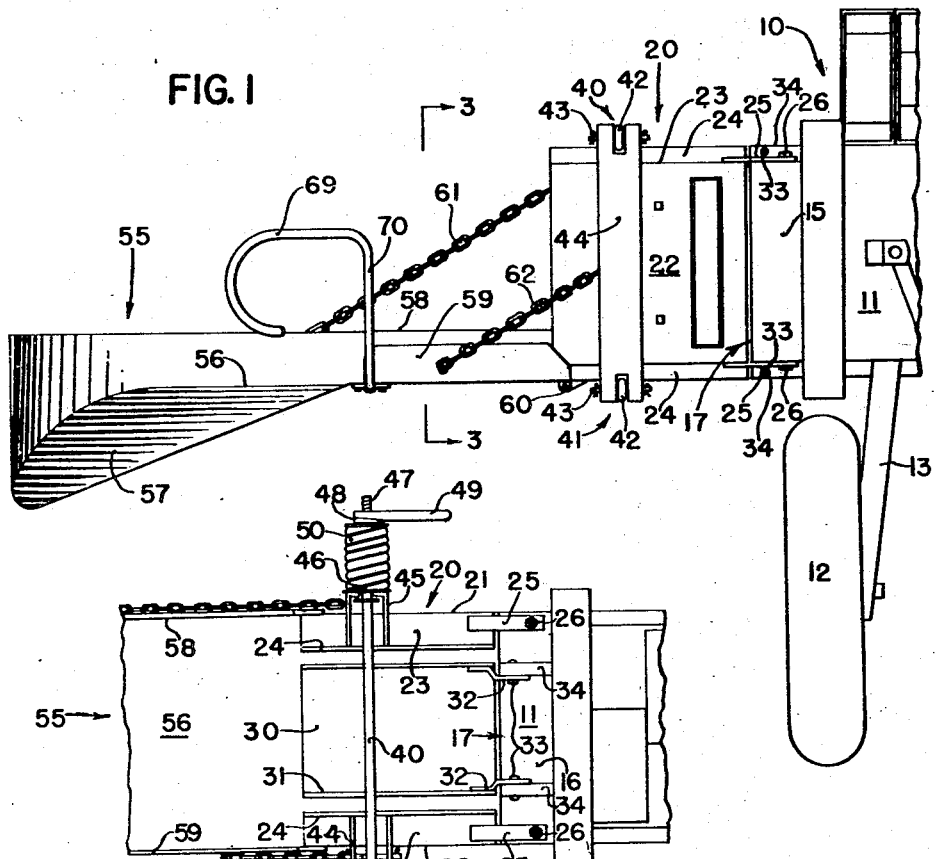
FIG. 1
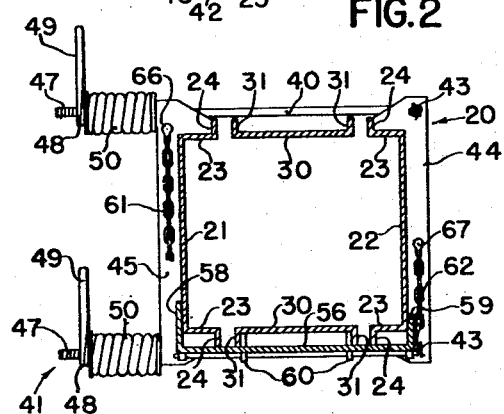
FIG. 2
FIG. 3
INVENTOR.
GEORGE B. HILL
ATTORNEYS.

Jan. 11, 1949. G. B. HILL 2,458,994
BALING PRESS
Filed Sept. 4, 1945 2 Sheets-Sheet 2

INVENTOR.
GEORGE B. HILL
ATTORNEYS.

Patented Jan. 11, 1949

2,458,994

UNITED STATES PATENT OFFICE 2,458,994

BALING PRESS

George B. Hill, Ottumwa, Iowa, assignor to Deere Manufacturing Co., a corporation of Iowa Application September 4, 1945, Serial No. 614,395

8 Claims. (Cl. 100—23)

The present invention relates generally to baling presses and more particularly to portable baling presses of the type which have a bale case disposed transversely of the direction of travel of the press, such, for example, the baling press disclosed in my co-pending application, Serial No. 514,707, filed December 17, 1943.

A transverse bale case is especially well adapted to presses provided with apparatus for picking up a windrow of crops for the reason that the crops can be moved in a straight line rearwardly into the front wall of the bale case without the necessity for the additional lateral conveying means necessary in connection with longitudinally extending bale cases. However, it is desirable that the transverse bale case be of a length of not more than about eight feet, in order that the implement can be transported through gates and along narrow roads, but it has been found that the baling operation requires a somewhat greater overall width in order to obtain the best results.

It is, therefore, one of the principal objects of the present invention to provide a bale case having an extension which can be quickly and easily installed and dismantled.

It is known to those skilled in the art that every bale case should be provided with means for resiliently constricting the outer or discharge end in order to apply pressure to the bales being formed and to offer sufficient resistance to longitudinal movement of the bales within the bale case to permit the baled material to be forced into the bale under appreciable pressure by the baling plunger. Inasmuch as a certain amount of relative movement between the sides of the bale case at the outer end thereof is necessary for obtaining this resilient compression function, it is another feature of my invention to provide sufficient relative movement between the outer portions of the bale case walls to provide not only for the yielding constriction, but also for completely collapsing the outer end of the bale case to shorten the overall transverse length thereof to permit the implement to be drawn through the gates of fields and along narrow roads.

Still another object has to do with the provision that the means for securing the extension walls in working position also includes resilient means for exerting a compressive force against the bales at the outer end of the bale case.

These and other objects and advantages of my invention will be apparent to those skilled in the art after a consideration of the following description, in which reference is had to the drawings appended hereto, in which Figure 1 is a rear elevational view of the outer end portion of a baling press embodying the principles of the present invention;

Figure 2 is a fragmentary top plan view of the bale case extension;

Figure 3 is an end elevational view taken in section along the line 3—3 in Figure 1;

Figure 4:
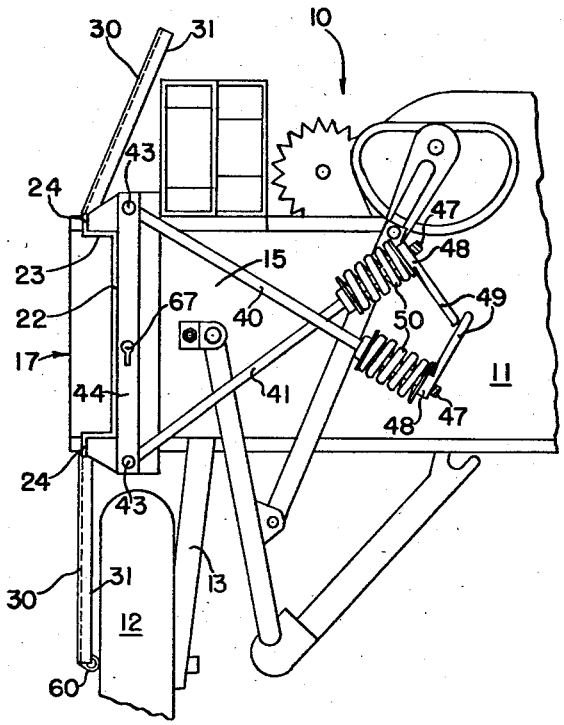
Figure 4 is a fragmentary rear elevational view, similar to Figure 1, but showing the bale case extension collapsed for transport purposes.

Referring now to the drawings, the hay press is indicated in its entirety by reference numeral 10 and comprises a transversely extending bale case 11 supported on a pair of laterally spaced ground wheels 12, only one of which is shown in the drawings. Each of the wheels 12 is journaled at the lower end of a supporting leg 13 beneath the bale case 11.

The bale case 11 is rectangular in cross section and comprises a pair of fore and aft spaced generally vertical side walls 15 and a pair of upper and lower generally horizontal walls 16. The four walls 15, 16 are rigidly joined together by any suitable means, such as by welding or the like to form a rigid case in which the harvested material is packed by means of a suitable plunger (not shown), which forces the bales toward the left, as viewed in Figure 1. The bale case 11 terminates outwardly of the supporting wheel 12 in a vertical plane, indicated by reference numeral 17, extending fore and aft immediately outside the plane of the wheel 12.

The bale case is provided with an extension section, indicated generally by reference numeral 20 disposed outwardly of the terminal plane 17 of the rigid bale case 11. The extension comprises a pair of fore and aft spaced generally vertical extension plates 21, 22 disposed substantially in the planes of the generally vertical side walls 15 outwardly of the ends thereof, respectively. Each of the side plates 21, 22 is turned inwardly along its top and bottom edges, as indicated at 23, and the inner edges of these generally horizontal portions 23 are turned outwardly to form flanges 24. The side plates 21, 22 are supported on a pair of bracket arms 25, which are rigidly fixed, as by welding, to the upper and lower horizontal portions 23 and extend laterally over the top and bottom walls 16 of the bale case 11, on which they are pivotally mounted by means of pivot bolts 26, thus providing for horizontal swinging movement of the side plates 21, 22 about the vertical aligned axes of the upper and lower pivot bolts 26. The bale case extension 20 also includes a pair of upper and lower, generally horizontal extension plates 30, the longitudinal edges of which are turned outwardly to form flanges 31 disposed along the flanges 24 of the side plates 21, 22. The horizontal plates 30 are supported on a pair of bracket arms 32, which are rigidly fixed, as by welding, to the generally vertical flanges 31 and extend inwardly therefrom and are pivotally connected by means of a pair of aligned pivot bolts 33 to a pair of supporting lugs 34, rigidly mounted on the top and bottom plates 16 of the bale case, respectively. The top plate 30 is swingable upwardly about the fore and aft extending axis of its supporting bolts 33 and the bottom plate 30 is swingable downwardly about the axis of its pivot bolts 33, to generally vertical inactive position disposed inwardly of the vertical plane 17 at the end of the bale case 11.

Figure 5:
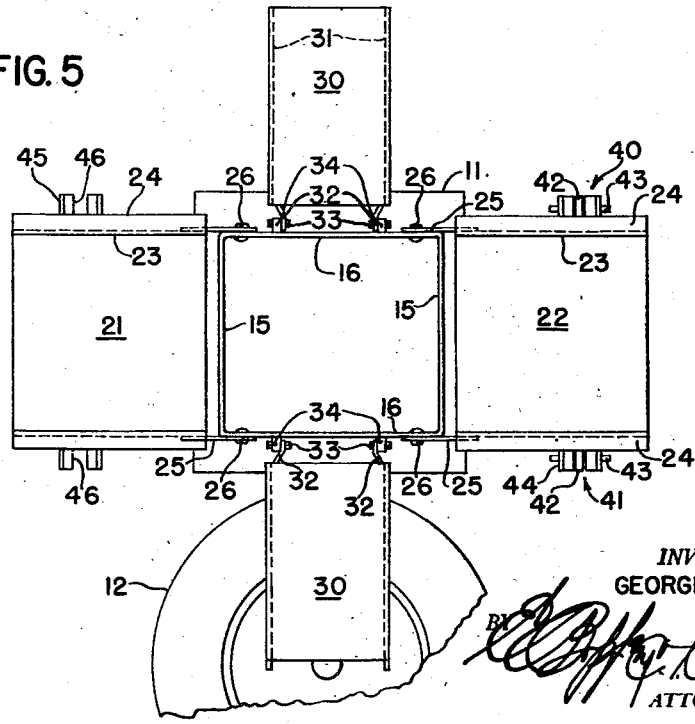
Figure 5 is an end elevational view of the bale case, arranged for transport.

Thus, it will be evident that with the extension plates 21, 22, 30 in their normal working position, as indicated in Figures 1 to 3, the plates serve as extensions of the respective walls 15, 16 of the bale case, but each of the extension plates can be swung outwardly from the working position to the inactive positions shown in Figures 4 and 5 for transport purposes, in which the plates are retracted to positions inwardly of the end plane 17 of the bale case. In these positions, the overall transverse length of the machine is restricted to the length of the rigid bale case 11, which is within the dimension required for transport through gates and along narrow roads, as explained hereinabove.

The extension plates 21, 22, 30 are secured in their working position by means of a pair of upper and lower tie rods 40, 41, each of which is provided with an eye 42, pivotally connected by pins 43 to a vertical channel beam 44, which is rigidly fixed to the outer side of the rear extension plate 22 with the edges of the beam 44 secured, as by welding, to the plate 22. A second channel beam 45 is secured to the forward vertical plate 21 and is provided with vertical slots 46 extending inwardly from the top and bottom ends thereof, respectively, as best indicated in Figure 5. Thus, the upper tie rod 40 can be swung about its pivot pin 43 until it extends forwardly over the top of the extension 20 and lies in the slot 46 in the channel 45. Similarly, the lower tie rod 41 can be swung under the extension 20 about the pivot pin 43 and is received within the slot 46 at the lower end of the beam 45. The outer ends of the tie rods 40, 41 are threaded at 47 to receive nuts 48, each of which is provided with a handle 49. Helical springs 50 encircle the tie rods 40, 41 and are adapted to bear against the outer side of the channel beam 45. The springs 50 are stressed in compression to urge the side plates 21, 22 toward each other in order to constrict the bale case extension 20 to apply pressure upon the bales as they leave the bale case. This pressure results in a resistance to outward sliding movement of the bales, which insures that the crop material is packed tightly in the bales. The nuts 48 can be turned on the threaded ends 47 to adjust the amount of pressure between the side plates 21, 22, which has the effect of adjusting the density of the formed bales.

The parts are shown in Figures 2 and 3 as they appear when there are bales moving through the bale case during operation, with the side plates 21, 22 forced outwardly, compressing the springs 50, until the side plates are substantially coplanar with the side walls 15 of the rigid bale case 11, and with the horizontal plates 30 forced by the bales outwardly against the tie rods 40, 41. Obviously, however, when the machine is empty, the springs 50 would force the plates 21, 22 together until the flanges 24 bear against the flanges 31 of the top and bottom plates 30. Then, as soon as the first bale moves out through the extension 20 of the case, the side plates 21, 22 are forced outwardly against the pressure of the springs 50 and the top and bottom plates 30 are forced against the tie rods 40, 41.

The completed bales emerge from the outer end of the bale case extension 20 upon a tail board structure, indicated generally by reference numeral 55, and comprising a floor plate 56, which extends laterally outwardly substantially in the plane of the lower plate 30, or slightly beneath the latter, the outer end of the plate 56 being bent downwardly and rearwardly, as indicated at 57, to discharge the completed bales rearwardly upon the ground. A pair of side walls 58, 59 extend along the front and rear edges of the floor plate 56, respectively, to guide the bales outwardly on the plate. The inner end of the tail board 55 is pivotally connected to the outer end of the bottom plate 30 by means of a hinge 60, providing for vertical swinging movement of the tail board 55 about the fore and aft extending axis of the hinge 60. The tail board 55 is supported in horizontal position for operation by means of a pair of chains 61, 62 connected to the guide walls 58, 59, respectively, at points spaced outwardly from the hinge 60, and the chains 61, 62 extend upwardly and inwardly and are secured at their inner ends to the channel beams 45, 44 by means of keyhole slots 66, 67, respectively. The angle of the floor plate 56 can be adjusted by lengthening or shortening the chains 61, 62, and this is easily accomplished by engaging different links of the chains 61, 62 with the narrow portions of the keyhole slots 66, 67.

The tail board is provided with a guide rail 69, which is mounted on an upright member 70 secured to the bottom of the floor plate 56. The rail 69 assists in guiding the bales over the inclined end portion 57 of the tail board, thereby depositing them on the ground in an orderly manner. This tail board is disclosed and claimed in an application by Jones and West, Serial No. 584,298, filed March 23, 1945.

To condition the machine for transport purposes, the tail board 55 is first removed by lifting the links of the chains 61, 62 out of the keyhole slots and disconnecting the hinge 60. The tail board can then be placed on top of the baling press in any convenient position, after which the nuts 48 are loosened by means of the handles 49 to relieve the spring compression, after which the tie rods 40, 41 can be swung out of the slots 46 in the beam 45, permitting the two side plates 21, 22 to be swung laterally to positions inwardly of the end plane 17 of the bale case 11. The upper plate 30 can then be swung upwardly to an overcenter position, as shown in Figure 4, while the lower plate 30 drops to a substantially vertically hanging position.

I claim:

1. In a baling press case comprising a pair of oppositely disposed side walls and a pair of opposed top and bottom walls, and a collapsible extension for said case comprising a plurality of extension plates pivotally mounted on said bale case by means providing for swinging movement from normal operating positions substantially in the planes of the side, top, and bottom walls, respectively, and extending beyond one end of the latter, to inactive positions inwardly of the ends thereof to shorten the overall length of said case, and means for detachably securing said extension plates in said normal position.

2. The combination set forth in claim 1, including the further provision that said securing means includes adjustable resilient connections for urging certain of said opposed plates toward each other.

3. The combination set forth in claim 1, including the further provision that said securing means includes a pair of tie rods spaced on opposite sides of said case extension, each of said rods being pivotally mounted on one of said plates, and having adjustable resilient means for connecting the rods to the opposite plate for urging the opposed plates toward each other for varying the pressure thereof against the baled material passing therebetween.

4. In a baling press, a bale case comprising a pair of oppositely disposed side walls and a pair of opposed top and bottom walls, and a collapsible extension for said case comprising a pair of extension side plates normally disposed substantially in the planes of said side walls outwardly of the ends thereof, respectively, means pivotally mounting said side plates on said bale case providing for lateral swinging movement of said plates to inactive positions, a pair of top and bottom extension plates normally disposed substantially in the planes of said top and bottom walls outwardly of the ends thereof, respectively, means pivotally mounting said top and bottom extension plates on said bale case providing for vertical swinging movement of said plates to inactive positions, and means for detachably securing said plates in said normal positions.

5. In a baling press, a wheel supported transversely disposed bale case of rectangular cross section and having a transverse length suitable for moving through gates and along narrow roads, said case including a pair of spaced generally vertical walls and a pair of generally horizontal top and bottom walls, and a collapsible extension at one end of said case comprising a pair of extension plates normally disposed substantially in the planes of said generally vertical walls outwardly of the ends thereof, respectively, means pivotally mounting said plates on said bale case providing for swinging said plates fore and aft, respectively, to folded positions substantially within the length of said bale case, a second pair of extension plates normally disposed substantially in the planes of said generally horizontal walls outwardly of the ends thereof, respectively, means pivotally mounting said second pair of plates on said bale case providing for swinging said plates vertically to folded positions substantially within the length of said bale case, and means for detachably securing said plates in their normal extended positions.

6. The combination set forth in claim 5, including the further provision of a tailboard pivotally mounted on the lower horizontal extension plate for vertical swinging movement and supporting means for said tailboard connected to said vertical plates.

7. The combination set forth in claim 5, including the further provision that said securing means includes adjustable resilient connections for urging one of said pair of opposed plates toward each other.

8. The combination set forth in claim 5, including the further provision that said securing means includes a pair of tie rods spaced on opposite sides of said case extension, each of said rods being pivotally mounted on one of said plates, and having adjustable resilient means for connecting the rods to the opposite plate for urging the opposed plates toward each other for varying the pressure thereof against the baled material passing therebetween.

GEORGE B. HILL.

REFERENCES CITED

The following references are of record in the file of this patent:

UNITED STATES PATENTS

| Number | Name | Date |
| --- | --- | --- |
| 335,290 | La Dow | Feb. 2, 1886 |
| 483,678 | St. John | Oct. 4, 1892 |
| 551,771 | Keith | Dec. 24, 1895 |
| 2,138,604 | Jones | Nov. 29, 1938 |
| 2,318,229 | Jones | May 4, 1943 |

Certificate of Correction

Patent No. 2,458,994. January 11, 1949.

GEORGE B. HILL

It is hereby certified that error appears in the printed specification of the above numbered patent requiring correction as follows:

Column 4, line 72, claim 1, after the word "press" insert , *a bale*;
and that the said Letters Patent should be read with this correction therein that the same may conform to the record of the case in the Patent Office.

Signed and sealed this 17th day of May, A. D. 1949.

[SEAL]

THOMAS F. MURPHY,
*Assistant Commissioner of Patents.*